United States Patent

Cantatore et al.

Patent Number: 4,751,281
Date of Patent: Jun. 14, 1988

[54] NOVEL POLYMERIC COMPOUNDS CONTAINING PIPERIDINE GROUPS

[75] Inventors: Giuseppe Cantatore, Bitonto; Valerio Borzatta, Bologna, both of Italy

[73] Assignee: Ciba-Geigy Corporation, Ardsley, N.Y.

[21] Appl. No.: 16,038

[22] Filed: Feb. 18, 1987

[30] Foreign Application Priority Data

Feb. 21, 1986 [IT] Italy ............................... 19508 A/86

[51] Int. Cl.[4] .................... C08G 63/68; C08G 69/44
[52] U.S. Cl. ................................... 528/289; 525/374; 528/230; 528/248; 528/291; 528/292; 528/310
[58] Field of Search ............. 528/230, 248, 289, 291, 528/292, 310; 525/375

[56] References Cited

U.S. PATENT DOCUMENTS

| | | | |
|---|---|---|---|
| 4,232,131 | 11/1980 | Rody et al. | 525/184 |
| 4,233,412 | 11/1980 | Rody et al. | 525/167 |
| 4,265,803 | 5/1981 | Soma et al. | 528/289 X |
| 4,267,231 | 5/1981 | Zamek | 428/379 |
| 4,351,915 | 9/1982 | Kubota et al. | 524/103 |
| 4,361,695 | 11/1982 | Di'Battista et al. | 528/289 |
| 4,368,317 | 1/1983 | Lohse et al. | 528/323 |
| 4,535,145 | 8/1985 | Troxler et al. | 528/289 |
| 4,546,148 | 10/1985 | Cantatore | 525/186 |
| 4,695,599 | 9/1987 | Cantatore | 524/103 |

*Primary Examiner*—Lucille M. Phynes
*Attorney, Agent, or Firm*—Harry Falber

[57] ABSTRACT

Novel polymeric compounds of the repeating structural unit (I)

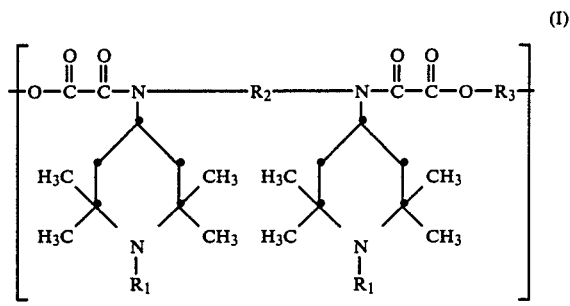

in which $R_1$ is hydrogen, $O^\bullet$, CN, cyanomethyl, $C_1$-$C_{12}$-alkyl, $C_3$-$C_{12}$-alkenyl or $C_3$-$C_{12}$-alkynyl subject to the proviso that the carbon atom attached to the nitrogen atom is a primary carbon atom, $C_7$-$C_{12}$-aralkyl, $C_1$-$C_{12}$-acyl, 2,3-epoxypropyl or $C_2$-$C_6$-alkyl substituted by OH, $R_2$ is $C_2$-$C_{18}$-alkylene, $C_4$-$C_{18}$-alkylene substituted by 1 or 2 oxygen or nitrogen atoms in the chain, $C_5$-$C_{18}$-cycloalkylene, $C_6$-$C_{18}$-arylene or $C_8$-$C_{18}$-aralkylene, $R_3$ is as defined for $R_2$ or is a group of the formula (II) or (III)

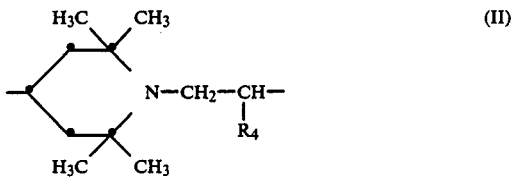

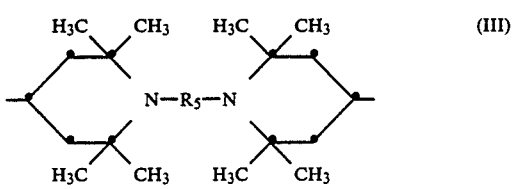

in which $R_4$ is hydrogen or $C_1$-$C_4$-alkyl and $R_5$ is $C_2$-$C_{12}$-alkylene, $C_4$-$C_{12}$-alkenylene subject to the proviso that the carbon atom attached to the nitrogen atom is a primary carbon atom, or is $C_8$-$C_{12}$-aralkylene are useful as light stabilizers, heat stabilizers and oxidation stabilizers for organic materials.

14 Claims, No Drawings

NOVEL POLYMERIC COMPOUNDS CONTAINING PIPERIDINE GROUPS

The present invention relates to novel polymeric compounds containing piperidine groups, the use thereof and to the organic material stabilized with the aid of said compounds against thermal, oxidative and/or light induced degradation.

It is known that synthetic polymers undergo more or less severe chemical and physical changes when they are subjected to the action of sunlight or other sources of ultraviolet radiation.

To retard the deleterious effect of ultraviolet radiations on synthetic polymers, suitable light stabilizers, such as certain benzophenone, benzotriazole, nickel complex, alkylene-malonate, cyanoacrylate and hindered amine compounds, are usually added to the polymers.

Certain low-molecular derivatives of 2,2,6,6-tetramethylpiperidine have shown significant activity; however, these have not solved the problem of stabilizing articles of extended surface development, such as polypropylene fibres, or of stabilizing polyethylene film, due to their well-known tendency to volatilization and extraction.

For these applications, certain relatively high-molecular derivatives of 2,2,6,6-tetramethylpiperidine have been proposed, which show good activity as light stabilizers and resistance to evaporation and extraction. In particular, certain polycarbamates containing piperidine groups have been claimed as stabilizers in U.S. Pat. No. 4,546,148 and polyamides containing piperidine groups are described in U.S. Pat. No. 4,232,131.

The present invention relates to compounds of the repeating structural unit (I)

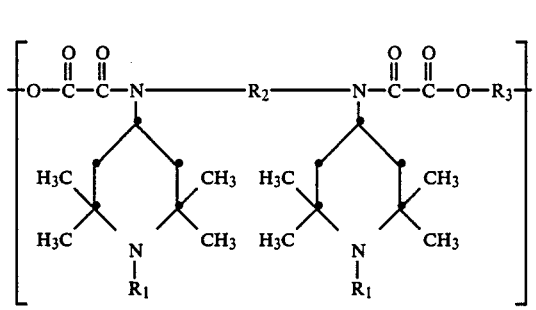

in which $R_1$ is hydrogen, 0°, CN, cyanomethyl, $C_1$–$C_{12}$-alkyl, $C_3$–$C_{12}$-alkenyl or $C_3$–$C_{12}$-alkynyl subject to the proviso that the carbon atom attached to the nitrogen atom is a primary carbon atom, $C_7$–$C_{12}$-aralkyl, $C_1$–$C_{12}$-acyl, 2,3-epoxypropyl or $C_2$–$C_6$-alkyl substituted by OH, $R_2$ is $C_2$–$C_{18}$-alkylene, $C_4$–$C_{18}$-alkylene substituted by 1 or 2 oxygen or nitrogen atoms in the chain, $C_5$–$C_{18}$-cycloalkylene, $C_6$–$C_{18}$-arylene or $C_8$–$C_{18}$-aralkylene, $R_3$ is as defined for $R_2$ or is a group of the formula (II) or (III)

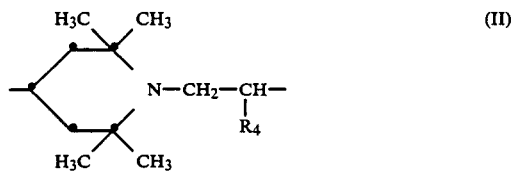

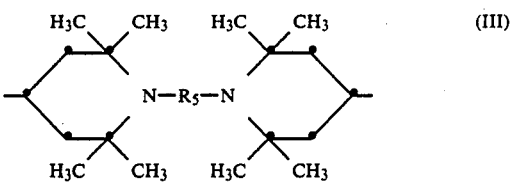

in which $R_4$ is hydrogen or $C_1$–$C_4$-alkyl and $R_5$ is $C_2$–$C_{12}$-alkylene, $C_4$–$C_{12}$-alkenylene subject to the proviso that the carbon atom attached to the nitrogen atom is a primary carbon atom, or is $C_8$–$C_{12}$-aralkylene.

$R_1$ as $C_1$–$C_{12}$-alkyl is for example methyl, ethyl, propyl, butyl, pentyl, hexyl, heptyl, octyl, decyl or dodecyl. $C_1$–$C_4$-alkyl, in particular methyl, is preferred.

$R_1$ is $C_3$–$C_{12}$-alkenyl is for example allyl, 2-methylallyl, 2-butenyl, 2-hexenyl or 10-undecenyl. Allyl is preferred.

$R_1$ is $C_3$–$C_{12}$-alkynyl is preferably propargyl.

$R_1$ as $C_7$–$C_{12}$-aralkyl may be $C_7$–$C_{10}$-phenylalkyl substituted or unsubstituted. Examples are benzyl, methylbenzyl, t-butylbenzyl and hydroxybenzyl. Benzyl unsubstituted or substituted by $C_1$–$C_5$-alkyl and/or OH is preferred.

$R_1$ as $C_1$–$C_{12}$-acyl may be an aliphatic or aromatic $C_1$–$C_{12}$-acyl group. $C_1$–$C_{12}$-alkanoyl, $C_3$–$C_{12}$-alkenoyl, $C_3$–$C_{12}$-alkynoyl and benzoyl are preferred. Examples are formyl, acetyl, propionyl, butyryl, caproyl, caprylyl, caprinoyl, lauroyl, benzoyl, acryloyl, methacryloyl and crotonyl. Acetyl is especially preferred.

$R_1$ is $C_2$–$C_6$-alkyl substituted by OH is for example 2-hydroxyethyl, 2-hydroxypropyl or 3-hydroxypropyl.

$R_2$ as $C_2$–$C_{18}$-alkylene and $R_5$ as $C_2$–$C_{12}$-alkylene are for example ethylene, 1,2-propylene, trimethylene, tetramethylene, pentamethylene, 2,2-dimethyl-1,3-propanediyl, hexamethylene, octamethylene, decamethylene or dodecamethylene. $C_2$–$C_6$-alkylene is preferred.

$R_2$ as $C_4$–$C_{18}$-alkylene substituted by 1 or 2 oxygen or nitrogen atoms in the chain is for example 3-oxapentane-1,5-diyl, 4-oxaheptane-1,7-diyl, 4,9-dioxadodecane-1,12-diyl, methyliminodiethylene or methylimino-dipropylene.

$R_2$ as $C_5$–$C_{18}$-cycloalkylene may be a saturated hydrocarbon group with two free valencies and at least one cyclic unit. Examples of $R_2$ are cyclohexylenedialkylene of 8 to 18 carbon atoms and alkylenedicyclohexylene of 13 to 18 carbon atoms which may optionally be substituted at the cyclohexylene ring by methyl. Cyclohexylenedimethylene, methylenedicyclohexylene and methylene-bis[methylcyclohexylene] are preferred.

$R_2$ may also be alkylidenedicyclohexylene with 14 to 18 carbon atoms, in particular isopropylidenedicyclohexylene, or $R_2$ may be cyclohexylene unsubstituted or substituted by $C_1$–$C_4$-alkyl. Cyclohexylene and methylcyclohexylene are preferred.

$R_2$ as $C_6$–$C_{18}$-arylene may be a hydrocarbon group with two free valencies and at least one aromatic carbocyclic unit.

$R_2$ is preferably biphenylene or phenylene unsubstituted or substituted by $C_1$–$C_4$-alkyl, with phenylene being preferred. Examples are methylphenylene and dimethylphenylene. Further examples of $R_2$ are alkylenediphenylene of 13 to 18 carbon atoms which may optionally be substituted at the phenylene group by methyl. Methylenediphenylene, methylenebis(methylphenylene) and methylenebis(dimethylphenylene) are preferred. $R_2$ may also be alkylidenediphenylene of 14 to 18 carbon atoms, in particulr isopropylidenediphenylene.

$R_2$ as $C_8-C_{18}$-aralkylene and $R_5$ as $C_8-C_{12}$-aralkylene are for example xylylene which may optionally be substituted by 1 to 4 methyl groups.

Examples of $R_4$ as $C_1-C_4$-alkyl are methyl, ethyl, propyl, isopropyl, butyl, 2-butyl, isobutyl and t-butyl. Methyl is preferred.

$R_5$ as $C_4-C_{12}$-alkenylene is in particular 2-butene-1,4-diyl.

Those polymeric compounds of the repeating structural unit (I) are preferred, in which $R_2$ is $C_2-C_{18}$-alkylene, $C_4-C_{18}$-alkylene substituted by 1 or 2 oxygen or nitrogen atoms in the chain, cyclohexylene unsubstituted or substituted by $C_1-C_4$-alkyl, $C_8-C_{18}$-cyclohexylenedialkylene, $C_{13}-C_{18}$-alkylenedicyclohexylene, phenylene unsubstituted or substituted by $C_1-C_4$-alkyl or xylylene unsubstituted or substituted by methyl, $R_3$ is as defined for $R_2$ or is a group of the formula (II) or (III) in which $R_4$ is hydrogen or $C_1-C_4$-alkyl and $R_5$ is $C_2-C_{12}$-alkylene, 2-buten-1,4-diyl or xylylene unsubstituted or substituted by methyl.

Those polymeric compounds of the repeating structural unit (I) are preferred, in which $R_1$ is hydrogen, methyl, allyl, benzyl or acetyl, $R_2$ is $C_2-C_{12}$-alkylene or $C_4-C_{12}$-alkylene substituted in the chain by 1 or 2 oxygen atoms, $R_3$ is $C_2-C_{12}$-alkylene, $C_4-C_{12}$-alkylene substituted in the chain by 1 or 2 oxygen atoms, $C_6-C_{14}$-cycloalkylene, a group of the formula (II) in which $R_4$ is hydrogen or methyl or a group of the formula (III) in which $R_5$ is $C_2-C_6$-alkylene, 2-butene-1,4-diyl or xylylene.

Those polymeric compounds of the repeating structural unit (I) are particularly preferred, in which $R_1$ is hydrogen or methyl, $R_2$ is $C_2-C_6$-alkylene, $R_3$ is $C_2-C_6$-alkylene or a group of the formula (II) in which $R_4$ is hydrogen or methyl.

$R_1$ is preferably hydrogen, methyl, allyl, benzyl or acetyl, in particular hydrogen or methyl.

$R_3$ is preferably a group of the formula (II) with $R_4$ being hydrogen.

Preferred examples of the repeating structural unit (I) are:

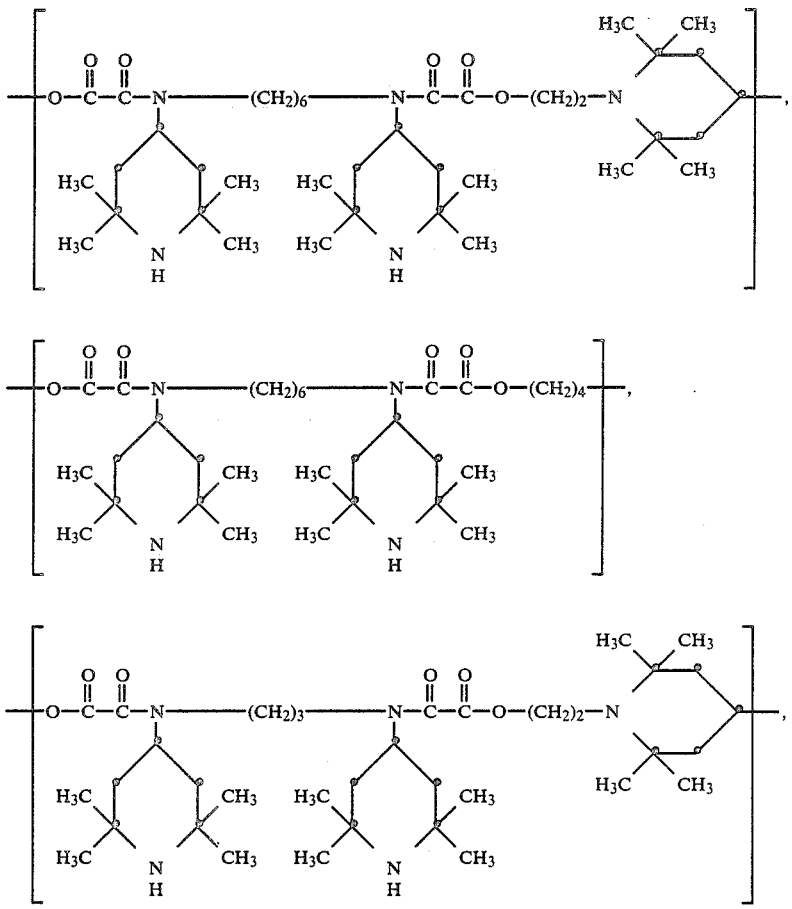

-continued
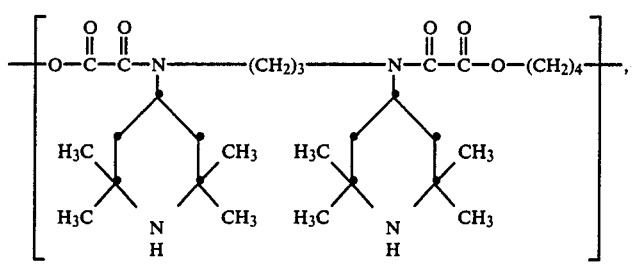
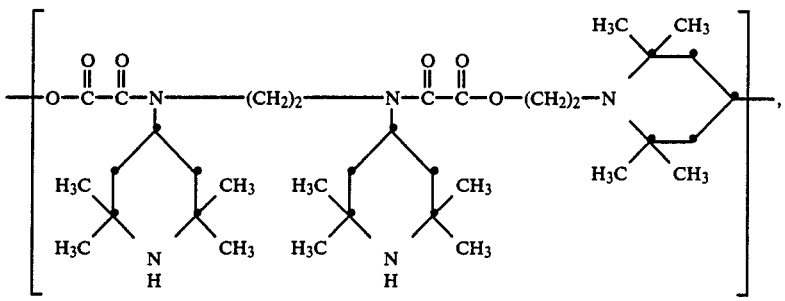
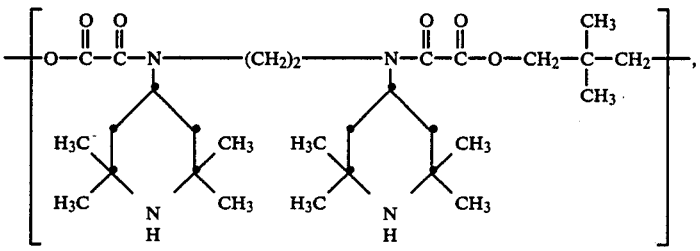
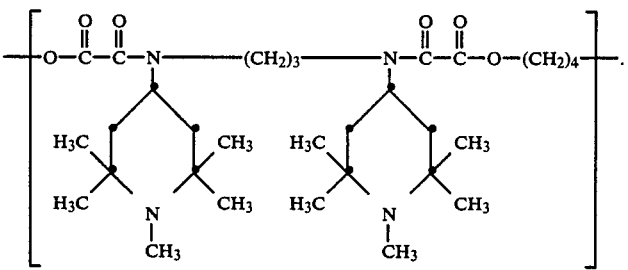
The structural units
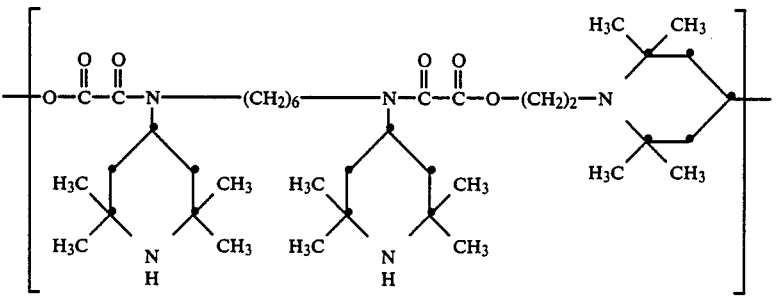
and -continued

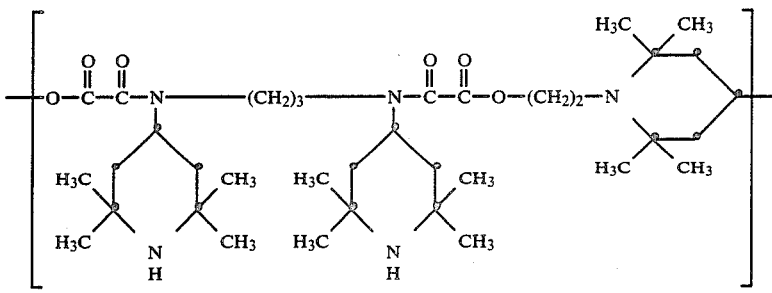

are especially preferred.

The polymeric compounds of the present invention generally contain 2 to 50 units of the formula (I), preferably 2 to 30, especially 2 to 20.

The terminal groups of the compounds of this invention result from the polymerization reaction and generally are residues of the functional groups of the employed reactants. The nature of said residues depends on the reaction conditions, for example the nature and amount of the reactants used, as it is known to one skilled in the art.

The compounds of the present invention can be prepared by analogy to known processes.

If the polymeric compounds of this invention are prepared, for example, by reacting a compound of the formula (IV)

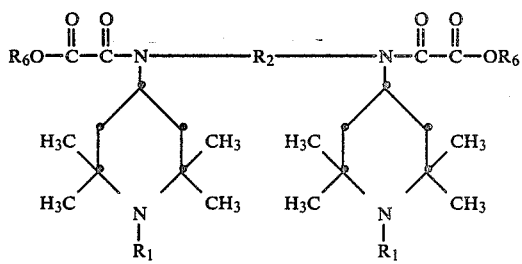

(IV)

in which $R_1$ and $R_2$ are as defined above and $R_6$ is for example $C_1$–$C_4$-alkyl, preferably methyl, ethyl or butyl, especially methyl or ethyl, with a diol of the formula (V)

HO—$R_3$—OH        (V)

where $R_3$ is as defined above, the terminal group attached to the

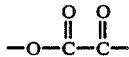

radical of the unit (I) may be $C_1$–$C_4$-alkyl or a group —$R_3$OH with $R_3$ being as defined above and the terminal group attached to the

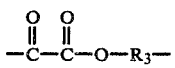

radical of the unit (I) may be OH or a group

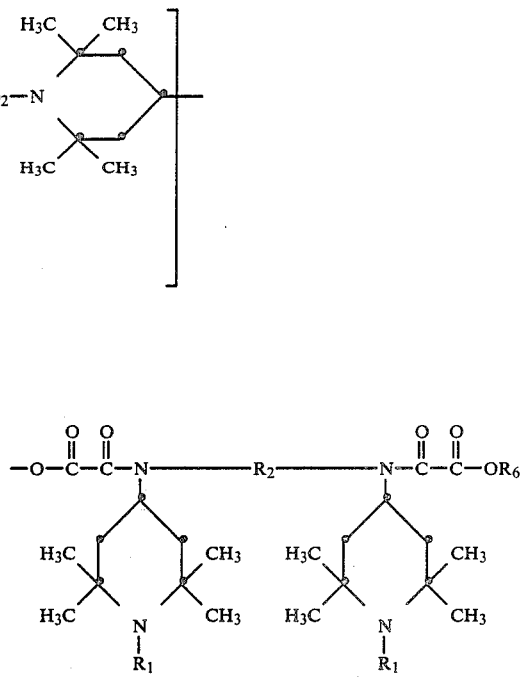

with $R_1$, $R_2$ and $R_6$ being as defined above.

The reaction can be carried out in the presence or absence of an inert solvent and in the presence of a transesterification catalyst, operating at a temperature from 100° to 250° C., preferably from 120° C. to 200° C.

As the catalyst, alkali metals, alkali metal alkoxides, amides or hydrides and titanium alkoxides can be used.

The reagents can be employed in a stoichiometric ratio or with an excess of one of the two reagents of up to 20% of theory.

The compounds of the formula (IV), the starting products for the preparation of the polymeric compounds of this invention, can be prepared by known processes, for example, as indicated in DE-A-3613194.

In order to illustrate the present invention more clearly, several examples of the preparation of the polymeric compounds of this invention are described below; these examples are given by way of illustration only and do not imply any restriction.

EXAMPLE 1

A mixture of 35.64 g (0.06 mol) of N,N'-bis-(ethoxyoxoacetyl)-N,N'-bis-(2,2,6,6-tetramethyl-4-piperidinyl)-1,6-hexanediamine, 12.06 g (0.06 mol) of 1-(2-hydroxyethyl)-2,2,6,6-tetramethyl-4-piperidinol, 1.7 g of tetraisopropyl titanate and 100 ml of xylene is heated under reflux for 8 hours under a gentle nitrogen stream, eliminating the ethanol of reaction.

The reaction mixture is evaporated to dryness in vacuo (1.33 mbar) up to 160° C.

After cooling, the residue is ground and dissolved in 80 ml of n-hexane, filtered to remove the insoluble residue and finally evaporated to dryness. This gives 40.1 g of product of melting point 147°–157° C. and $\overline{M}n$ 3,370.

EXAMPLE 2

Following the procedure of Example 1, a polyoxamate is prepared from 47.52 g (0.08 mol) of N,N'-bis-(ethoxyoxoacetyl)-N,N'-bis-(2,2,6,6-tetramethyl-4- piperidinyl)-1,6-hexanediamine and 7.2 g (0.08 mol) of 1,4-butanediol.

The product obtained has a melting point of 115°–120° C. and $\overline{M}n$ 3,350.

EXAMPLE 3

Following the procedure of Example 1, a polyoxamate is prepared from 38.64 g (0.07 mol) of N,N'-bis-(ethoxyoxoacetyl)-N,N'-bis-(2,2,6,6-tetramethyl-4-piperidinyl)-1,3-propanediamine and 14.07 g (0.07 mol) of 1-(2-hydroxyethyl)-2,2,6,6-tetramethyl-4-piperidinol.

The product obtained has a melting point of 175°–183° C. and $\overline{M}n$ 3,100.

EXAMPLE 4

Following the procedure of Example 1, a polyoxamate is prepared from 55.2 g (0.1 mol) of N,N'-bis-(ethoxyoxoacetyl)-N,N'-bis-(2,2,6,6-tetramethyl-4-piperidinyl)-1,3-propanediamine and 9 g (0.1 mol) of 1,4-butanediol.

The product obtained has a melting point of 118°–124° C. and $\overline{M}n$ 3,150.

EXAMPLE 5

Following the procedure of Example 1, a polyoxamate is prepared from 53.8 g (0.1 mol) of N,N'-bis-(ethoxyoxoacetyl)-N,N'-bis-(2,2,6,6-tetramethyl-4-piperidinyl)-1,2-ethanediamine and 20.1 g (0.1 mol) of 1-(2-hydroxyethyl)-2,2,6,6-tetramethyl-4-piperidinol.

The product obtained has a melting point of 226°–231° C. and $\overline{M}n$ 1,600.

EXAMPLE 6

Following the procedure of Example 1, a polyoxamate is prepared from 32.3 g (0.06 mol) of N,N'-bis-(ethoxyoxoacetyl)-N,N'-bis-(2,2,6,6-tetramethyl-4-piperidinyl)-1,2-ethanediamine and 2,2-dimethyl-1,3-propanediol.

The product obtained has a melting point of 153°–158° C. and $\overline{M}n$ 2,100.

EXAMPLE 7

28.9 g of the polyoxamate of Example 4, 4.5 g of paraformaldehyde, 6.9 g of formic acid and 120 ml of tert-butyl alcohol are heated under reflux for 6 hours. The solvent is evaporated and the residue is taken up in 100 ml of methylene chloride. The obtained solution is washed with an aqueous solution of $K_2CO_3$ (40%) and, finally, with water. The organic solution is then dried over sodium sulfate, filtered and the solvent is removed under vacuum.

The obtained product has a melting point of 124°–129° C. and $\overline{M}n$ 3,160.

As mentioned at the outset, the polymeric compounds of the instant invention are very effective in improving the light stability, heat stability and oxidation stability of organic material, in particular synthetic polymers and copolymers.

Examples of such organic materials are:

Polymers of monoolefins and diolefins, for example polyethylene (which may be crosslinked), polypropylene, polyisobutylene, poly-1-butene, polymethyl-1-pentene, polyisoprene or polybutadiene, and also polymers of cycloolefins, for example of cyclopentene or norbornene. Mixtures of the said polymers, for example mixtures of polypropylene with polyisobutylene.

Copolymers of monoolefins and diolefins with one another or with other vinyl monomers, for example ethylene/propylene, propylene/1-butene, propylene/isobutylene, ethylene/1-butene, propylene/butadiene, isobutylene/isoprene, ethylene/vinyl acetate, ethylene/alkyl acrylates, ethylene/alkyl methacrylates or ethylene/acrylic acid copolymers and their salts (ionomers) and terpolymers of ethylene with propylene and a diene such as hexadiene, dicyclopentadiene or ethylidenenorbornene.

Polystyrene and poly-(p-methylstyrene).

Copolymers of styrene or α-methylstyrene with dienes or acrylic derivatives, for example styrene/butadiene, styrene/acrylonitrile, styrene/ethyl methacrylate, styrene/butadiene/ethyl acrylate, styrene/acrylonitrile/methyl acrylate, high-impact strength mixtures of styrene copolymers and other polymers, for example a polyacrylate, a diene polymer or an ethylene/propylene/diene terpolymer, and block copolymers of styrene, for example styrene/butadiene/styrene, styrene/isoprene/styrene, styrene/ethylene/butylene/styrene or styrene/ethylene/propylene/styrene.

Graft copolymers of styrene, for example styrene on polybutadiene, styrene and acrylonitrile on polybutadiene, styrene and alkyl acrylates or methacrylates on polybutadiene, styrene and acrylonitrile on ethylene/propylene/diene terpolymers, styrene and acrylonitrile on polyacrylates or polymethacrylates, styrene and acrylonitrile on acrylate/butadiene copolymers, and also mixtures with the copolymers mentioned under the preceding heading, for example the mixtures known as ABS, MBS, ASA or AES polymers.

Halogen-containing polymers, such as polychloroprene, chlorinated rubbers, chlorinated or sulfochlorinated polyethylene, polymers and copolymers of epichlorohydrin, polymers of halogen-containing vinyl compounds, for example polyvinyl chloride, polyvinylidene chloride, polyvinyl fluoride and polyvinylidene fluoride, and also copolymers thereof, for example vinyl chloride/vinylidene chloride, vinyl chloride/vinyl acetate or vinylidene chloride/vinyl acetate copolymers.

Polymers derived from α,β-unsaturated acids and their derivatives, such as polyacrylates and polymethacrylates, polyacrylamides and polyacrylonitrile.

Copolymers of the monomers under the preceding heading, mixed with one another or with other unsaturated monomers, for example acrylonitrile/butadiene, acrylonitrile/alkyl acrylate, acrylo-nitrile/alkoxyalkyl acrylate or acrylonitrile/vinyl halide copolymers or acrylonitrile/alkyl methacrylate/butadiene terpolymers.

Polymers derived from unsaturated alcohols and amines or their acyl or acetal derivatives, such as polyvinyl alcohol, polyvinyl acetate, polyvinyl stearate, polyvinyl benzoate, polyvinyl maleate, polyvinyl butyral, polyallyl phthalate or polyallylmelamine.

Homopolymers and copolymers of cyclic ethers, such as polyalkylene glycols, polyethylene oxide, polypropylene oxide or their copolymers with bis-glycidyl ethers.

Polyacetals, such as polyoxymethylene and the polyoxymethylenes containing ethylene oxide as a comonomer.

Polyphenylene oxides and sulfides, and mixtures of polyphenylene oxides with polystyrene.

Polyurethanes derived on the one hand from polyethers, polyesters or polybutadiene with hydroxyl end groups and, on the other hand, aliphatic or aromatic polyisocyanates, and also their precursors (polyisocyanates, polyols or prepolymers).

Polyamides and copolyamides derived from diamines and dicarboxylic acids and/or aminocarboxylic acids or the corresponding lactams, such as nylon-4, nylon-6, nylon-6/6, nylon-6/10, nylon-11, nylon-12, poly-2,4,4-trimethylhexamethylene-terephthalamide or poly-m-phenylene-isophthalamide, and also their copolymers with polyethers, for example with polyethylene glycols, polypropylene glycols or polytetramethylene glycols.

Polyureas, polyimides and polyamide-imides.

Polyesters derived from dicarboxylic acids and diols and/or hydroxycarboxylic acids or corresponding lactones, such as polyethylene terephthalate, polybutylene terephthalate, poly-1,4-dimethylolcyclohexane terephthalate, poly-2,2-(4-hydroxyphenyl)-propane terephthalate and polyhydroxybenzoate, and also the block copolyetheresters derived from polyethers with hydroxyl end groups.

Polycarbonates and polyester-carbonates.

Polysulfones, polyether-sulfones and polyetherketones.

Crosslinked polymers derived from aldehydes on the one hand and phenols, ureas and melamines on the other hand, such as phenol/formaldehyde resins, urea/formaldehyde resins and melamine/formaldehyde resins.

Drying and non-drying alkyd resins.

Unsaturated polyester resins derived from copolyesters of saturated and unsaturated dicarboxylic acids with polyalcohols and vinyl compounds as crosslinking agents, and also their halogen-containing modifications of low inflammability.

Themosetting acrylic resins derived from substituted acrylic esters, such as epoxy-acrylates, urethane-acrylates and polyester-acrylates.

Alkyd resins, polyester resins or acrylate resins mixed with melamine resins, urea resins, polyisocyanates or epoxide resins as crosslinking agents.

Crosslinked epoxide resins derived from polyepoxides, for example from bis-glycidyl ethers or cycloaliphatic diepoxides.

Natural polymers of the type of cellulose, rubber, gelatine and their derivatives with chemical polymer-homologous modifications, such as cellulose acetates, cellulose propionates and cellulose butyrates, or cellulose ethers such as methylcellulose.

Mixtures of the above polymers, for example PP/EPDM, nylon-6/EPDM or ABS, PVC/EVA, PVC/ABS, PVC/MBS, PC/ABS and PBTP/ABS.

The polymeric compounds of this invention are particularly useful as light stabilizers for polypropylene fibres and tapes and polyethylene films.

The polymeric compounds of the instant invention can be mixed with organic materials in various proportions depending on the nature of the organic material, on the end use and on the presence of other additives.

In general, it is advantageous to employ from 0.01 to 5% by weight of the polymeric compounds of the present invention, relative to the weight of the organic material, preferably from 0.05 to 1%. The compounds of this invention can be incorporated into the organic materials via various processes, such as dry blending in the form of powders, or mixing in the form of solutions or suspensions, or mixing in the form of a masterbatch; in these operations, the organic material can be employed in the form of powder, granules, a solution, a suspension or in the form of a latex.

The organic materials stabilized with the products of the instant invention can be used for the preparation of moulded articles, films, tapes, fibres, monofilaments, surface-coatings and the like.

If desired, other additives, such as antioxidants, UV absorbers, nickel stabilizers, pigments, fillers, plasticizers, antistatic agents, flameproofing agents, lubricants, anti-corrosion agents and metal deactivators, can be added to the mixtures of the compounds of this invention with the organic materials.

Examples of additives which can be mixed with the compounds of this invention are in particular:

Antioxidants Belonging to the Following Classes

Alkylated monophenols, for example: 2,6-Di-t-butyl-4-methylphenol, 2-t-butyl-4,6-dimethylphenol, 2,6-di-t-butyl-4-ethylphenol, 2,6-di-t-butyl-4-n-butylphenol, 2,6-di-t-butyl-4-i-butylphenol, 2,6-di-cyclopentyl-4-methylphenol, 2-(α-methylcyclohexyl)-4,6-dimethylphenol, 2,6-dioctadecyl-4-methylphenol, 2,4,6-tricyclohexylphenol and 2,6-di-t-butyl-4-methoxymethylphenol.

Alkylated hydroquinones, for example: 2,6-Di-t-butyl-4-methoxyphenol, 2,5-di-t-butylhydroquinone, 2,5-di-t-amylhydroquinone and 2,6-diphenyl-4-octadecyloxyphenol.

Thiobisphenols, for example: 2,2'-Thio-bis-(6-t-butyl-4-methylphenol), 2,2'-thio-bis-(4-octylphenol), 4,4'-thio-bis-(6-t-butyl-3-methylphenol) and 4,4'-thio-bis-(6-t-butyl-2-methylphenol).

Alkylidene-bisphenols, for example: 2,2'-Methylene-bis-(6-t-butyl-4-methylphenol), 2,2'-methylene-bis-(6-t-butyl-4-ethylphenol), 2,2'-methylene-bis-[4-methyl-6-(α-methylcyclohexyl)-phenol], 2,2'-methylene-bis-(4-methyl-6-cyclohexylphenol), 2,2'-methylene-bis-(6-nonyl-4-methylphenol), 2,2'-methylene-bis-[6-(α-methylbenzyl)-4-nonylphenol], 2,2'-methylene-bis-[6-(α,α-dimethylbenzyl)-4-nonylphenol], 2,2'-methylene-bis-(4,6-di-t-butylphenol), 2,2'-ethylidene-bis-(4,6-di-t-butylphenol), 2,2'-ethylidene-bis-(6-t-butyl-4-isobutylphenol), 4,4'-methylene-bis-(2,6-di-t-butylphenol), 4,4'-methylene-bis-(6-t-butyl-2-methylphenol), 1,1-bis-(5-t-butyl-4-hydroxy-2-methylphenyl)-butane, 2,6-bis-(3-t-butyl-5-methyl-2-hydroxybenzyl)-4-methylpenol, 1,1,3-tris-(5-t-butyl-4-hydroxy-2-methylphenyl)-butane, 1,1-bis-(5-t-butyl-4-hydroxy-2-methylphenyl)-3-n-dodecyl-mercaptobutane, ethylene glycol bis-[3,3-bis-(3'-t-butyl-4'-hydroxyphenyl-butyrate], bis-(3-t-butyl-4-hydroxy-5-methylphenyl)-dicyclopentadiene and bis-[2-(3'-t-butyl-2'-hydroxy-5'-methylbenzyl)-6-t-butyl-4-methylphenyl]terephthalate.

Benzyl compounds, for example: 1,3,5-Tris-(3,5-di-t-butyl-4-hydroxybenzyl)-2,4,6-trimethylbenzene, bis-(3,5-di-t-butyl-4-hydroxybenzyl)sulfide, isooctyl 3,5-di-t-butyl-4-hydroxybenzyl-mercaptoacetate, bis-(4-t-butyl-3-hydroxy-2,6-dimethylbenzyl) dithiolterephthalate, 1,3,5-tris-(3,5-di-t-butyl-4-hydroxybenzyl)isocyanurate, 1,3,5-tris-(4-t-butyl-3-hydroxy-2,6-dimethylbenzyl)isocyanurate, dioctadecyl 3,5-di-t-butyl-4-hydroxybenzyl-phosphonate and calcium monoethyl 3,5-di-t-butyl-4-hydroxybenzyl-phosphonate.

Acylaminophenols, for example: Lauric acid 4-hydroxyanilide, stearic acid 4-hydroxyanlide, 2,4-bis-(octylmercapto)-6-(3,5-di-t-butyl-4-hydroxyanilino)-s-triazine and octyl N-(3,5-di-t-butyl-4-hydroxyphenyl)-carbamate.

Esters of β-(3,5-di-t-butyl-4-hydroxyphenyl)-propionic acid with monohydric or polyhydric alcohols, for example: methanol, octadecanol, 1,6-hexanediol, neopentyl glycol, thiodiethylene glycol, diethylene glycol, triethylene glycol, pentaerythritol, tris-(hydroxyethyl)-isocyanurate and N,N'-bis-(hydroxyethyl)-oxamide.

Esters of β-(5-t-butyl-4-hydroxy-3-methylphenyl)-propionic acid with monohydric or polyhydric alcohols, for example: methanol, octadecanol, 1,6-hexanediol, neopentyl glycol, thiodiethylene glycol, diethylene glycol, triethylene glycol, pentaerythritol, tris-(hydroxyethyl)-isocyanurate and N,N'-bis-(hydroxyethyl)-oxamide.

Amides of β-(3,5-di-t-butyl-4-hydroxyphenyl)-propionic acid: N,N'-Bis-(3,5-di-t-butyl-4-hydroxyphenylpropionyl)-hexamethylenediamine, N,N'-bis-(3,5-di-t-butyl-4-hydroxyphenylpropionyl)-trimethylenediamine and N,N'-bis-(3,5-di-t-butyl-4-hydroxyphenylpropionyl)-hydrazine.

UV Absorbers and Light Stabilizers Belonging to the Following Groups 2-(2'-Hydroxyphenyl)-benzotriazoles, for example the 5'-methyl, 3',5'-di-t-butyl, 5'-t-butyl, 5'-(1,1,3,3-tetramethylbutyl), 5-chloro-3',5'-di-t-butyl, 5-chloro-3'-t-butyl-5'-methyl, 3'-sec.-butyl-5'-t-butyl, 4'-octoxy-3',5'-di-t-amyl and 3',5'-bis-(α,α-dimethylbenzyl) derivatives.

2-Hydroxybenzophenones, for example the 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivatives.

Esters of various substituted benzoic acids, for example: phenyl salicylate, 4-t-butylphenyl salicylate, octylphenyl salicylate, dibenzoylresorcinol, bis-(4-t-butylbenzoyl)-resorcinol, benzoylresorcinol, 2,4-di-t-butylphenyl 3,5-di-t-butyl-4-hydroxybenzoate, hexadecyl 3,5-di-t-butyl-4-hydroxybenzoate and N-ethyl-N-phenyl-N'-(p-ethoxycarbonylphenyl)-formamidine.

Acrylates, for example ethyl or isooctyl α-cyano-β,β-diphenylacrylate, methyl α-carbomethoxycinnamate, methyl or butyl α-cyano-β-methyl-p-methoxycinnamate, methyl α-carbomethoxy-p-methoxycinnamate and N-(β-carbomethoxy-β-cyanovinyl)-2-methylindoline.

Nickel compounds, for example nickel complexes of 2,2'-thio-bis-[4-(1,1,3,3-tetramethylbutyl)-phenol], such as the 1:1 or 1:2 complexes, which may contain additional ligands such as n-butylamine, triethanolamine or N-cyclohexyl-diethanolamine, nickel dibutyldithiocarbamate, nickel salts of the monoalkyl esters of 4-hydroxy-3,5-di-t-butylbenzylphosphonic acid, such as the methyl, ethyl or butyl esters, nickel complexes of ketoximes such as 2-hydroxy-4-methylphenyl undecyl ketoxime and nickel complexes of 1-phenyl-4-lauroyl-5-hydroxypyrazole with or without additional ligands.

Sterically hindered amines, for example bis-(2,2,6,6-tetramethylpiperidyl) sebacate, bis-(1,2,2,6,6-pentamethylpiperidyl) sebacate, bis-(1,2,2,6,6-pentamethylpiperidyl) n-butyl-3,5-di-t-butyl-4-hydroxybenzylmalonate, the condensation product of 1-(hydroxyethyl)-2,2,6,6-tetramethyl-4-hydroxypiperidine and succinic acid, the condensation product of N,N'-bis-(2,2,6,6-tetramethylpiperidyl)hexamethylenediamine and 4-t-octylamino-2,6-dichloro-1,3,5-triazine, tris-(2,2,6,6-tetramethylpiperidyl) nitrilotriacetate, tetrakis-(2,2,6,6-tetramethylpiperidyl) 1,2,3,4-butanetetracarboxylate and 1,1'-(1,2-ethanediyl)-bis-(3,3,5,5-tetramethylpiperazinone).

Oxalic acid diamides, for example 4,4'-dioctyloxy-oxanilide, 2,2'-dioctyloxy-5,5'-di-t-butyloxanilide, 2,2'-didodecyloxy-5,5'-di-t-butyloxanilide, 2-ethoxy-2'-ethyloxanilide, N,N'-bis-(3-dimethylaminopropyl)-oxalamide, 2-ethoxy-5-t-butyl-2'-ethyloxanilide and its mixtures with 2-ethoxy-2'-ethyl-5,4'-di-t-butyloxanilide, and mixtures of ortho- and para-methoxy- and also o- and p-ethoxy-di-substituted oxanilides.

Metal deactivators, for example N,N'-diphenyloxamide, N-salicylal-N'-salicyloylhydrazine, N,N'-bis-(salicyloyl)-hydrazine, N,N'-bis-(3,5-di-t-butyl-4-hydroxyphenylpropionyl)-hydrazine, 3-salicyloylamino-1,2,4-triazole and bis-(benzylidene)-oxalodihydrazide.

Phosphites and phosphonites, for example triphenyl phosphite, diphenyl alkyl phosphites, phenyl dialkyl phosphites, tris-(nonylphenyl) phosphite, trilauryl phosphite, trioctadecyl phosphite, distearyl pentaerylthritol diphosphite, tris-(2,4-di-t-butylphenyl) phosphite, diisodecyl pentaerythritol diphosphite, di-(2,4-di-t-butylphenyl) pentaerythritol diphosphite, tristearyl sorbitol diphosphite and tetrakis-(2,4-di-t-butylphenyl) 4,4'-diphenylene-diphosphite.

Peroxide-destroying compounds, for example esters of β-thiodipropionic acid, for example the lauryl, stearyl, myristyl or tridecyl esters, mercaptobenzimidazole or the zinc salt of 2-mercaptobenzimidazole, zinc dibutyl-dithiocarbamate, dioctadecyl disulfide and pentaerythritol tetrakis-(β-dodecyl-mercapto)propionate.

Polyamide stabilizers, for example copper salts in combination with iodides and/or phosphorus compounds and divalent manganese salts.

Basic costabilizers, for example melamine, polyvinylpyrrolidone, dicyandiamide, triallyl cyanurate, urea derivatives, hydrazine derivatives, amines, polyamides, polyurethanes, alkali metal or alkaline earth metal salts of higher fatty acids, for example calcium stearate, zinc stearate, magnesium stearate, sodium ricinoleate and potassium palmitate, antimony pyrocatecholate or zinc pyrocatecholate.

Nucleating agents, for example 4-t-butylbenzoic acid, adipic acid and diphenylacetic acid.

Fillers and reinforcing agents, for example calcium carbonate, silicates, glass fibres, asbestos, talc, kaolin, mica, barium sulfate, metal oxides and hydroxides, carbon black and graphite.

Further additives, for example plasticizers, lubricants, emulsifiers, pigments, fluorescent brighteners, flameproofing agents, antistatic agents and foaming agents can be used.

The efficiency, as stabilizers, of the products of the present invention is illustrated by the examples which follow in which some products obtained in the preparation examples are used for stabilizing polypropylene tapes and fibres.

EXAMPLE 8

2 g of each of the compounds indicated in Table 1, 0.5 g of tris-(2,4-di-t-butylphenyl) phosphite, 0.5 g of pentaerythritol tetrakis-[3-(3,5-di-t-butyl-4-hydroxyphenyl)-propionate] and 1 g of calcium stearate are mixed in a powder mixer with 1,000 g of polypropylene powder (melt index=3 g/10 min; measured at 230° C. and 2.16 kp).

The mixtures obtained are extruded at a temperature of 200°–220° C. to give polymer granules which are then converted into stretched tapes of 50 μm thickness and 2.5 mm width, under the following working conditions:
Extruder temperature: 220°–240° C.
Head temperature: 240° C.
Stretch ratio: 1:6

The tapes thus prepared are exposed, mounted on a white card, in a 65 WR model Weather-O-Meter (ASTM G 26-77), with a black panel temperature of 63° C.

The residual tenacity is measured on samples, taken after various times of exposure to light, by means of a constant-speed tensometer; the exposure time in hours ($T_{50}$) needed to halve the initial tenacity is then calculated.

For comparison, tapes prepared under the same conditions as indicated above, but without the addition of the compounds of the invention, are exposed.

The results obtained are shown in the table.

TABLE 1

| Stabilizer | $T_{50}$ (hours) |
| --- | --- |
| Without stabilizer | 220 |
| Compound of Example 1 | 2,510 |
| Compound of Example 2 | 1,940 |
| Compound of Example 3 | 2,090 |
| Compound of Example 5 | 2,650 |

EXAMPLE 9

2.5 g of each of the compounds indicated in Table 2, 0.25 g of tris-(2,4-di-t-butylphenyl) phosphite, 0.25 g of pentaerythritol tetrakis-[3-(3,5-di-t-butyl-4-hydroxyphenyl)-propionate] and 0.5 g of calcium bis-[ethyl-(3,5-di-t-butyl-4-hydroxybenzylphosphonate)], 1 g of calcium stearate and 2.5 g of titanium dioxide are mixed in a powder mixer with 1,000 g of polypropylene powder (melt index = 12 g/10 min; meausred at 230° C. and 2.16 kp).

The mixtures are extruded at 200°–220° C. to give polymer granules which are then converted into fibres, under the following working conditions:
Temperature of the extruder: 220°–240° C.
Spinneret temperature: 240° C.
Stretch ratio: 1:3.5
Titre: 22 dtex per filament The fibres thus prepared are exposed on a white card in a 65 WR model Weather-O-Meter (ASTM G 26-77), with a black panel temperature of 63° C. The $T_{50}$ value is then calculated as described in the preceding example.

For comparison, fibres prepared under the same conditions as described above, but without the addition of the compounds of the invention, are exposed.

The results obtained are shown in Table 2.

TABLE 2

| Stabilizer | $T_{50}$ (hours) |
| --- | --- |
| Without stabilizer | 110 |
| Compound of Example 1 | 2,230 |
| Compound of Example 2 | 1,770 |
| Compound of Example 3 | 1,680 |

What is claimed is:
1. A polymeric compound of the repeating structural unit (I)

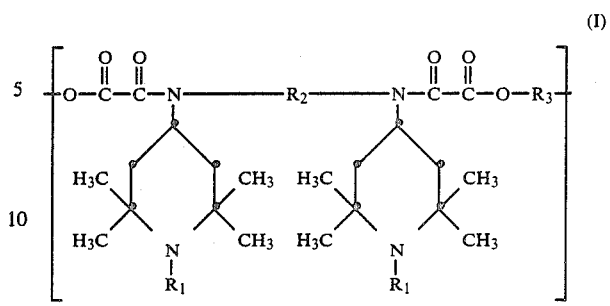

in which $R_1$ is hydrogen, 0°, CN, cyanomethyl, $C_1$–$C_{12}$-alkyl, $C_3$–$C_{12}$-alkenyl or $C_3$–$C_{12}$-alkynyl subject to the proviso that the carbon atom attached to the nitrogen atom is a primary carbon atom, $C_7$–$C_{12}$-aralkyl, $C_1$–$C_{12}$-acyl, 2,3-epoxypropyl or $C_2$–$C_6$-alkyl substituted by OH, $R_2$ is $C_2$–$C_{18}$-alkylene, $C_4$–$C_{18}$-alkylene substituted by 1 or 2 oxygen or nitrogen atoms in the chain, $C_5$–$C_{18}$-cycloalkylene, $C_6$–$C_{18}$-arylene or $C_8$–$C_{18}$-aralkylene, $R_3$ is as defined for $R_2$ or is a group of the formula (II) or (III)

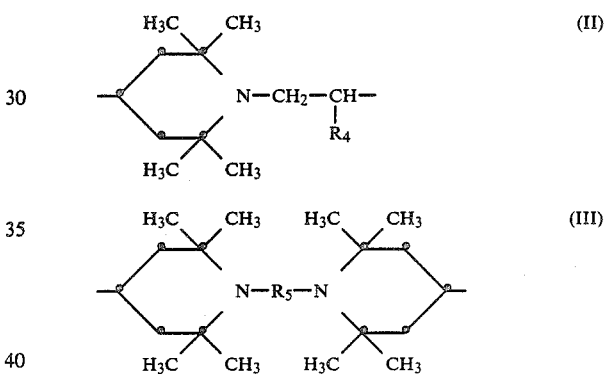

in which $R_4$ is hydrogen or $C_1$–$C_4$-alkyl and $R_5$ is $C_2$–$C_{12}$-alkylene, $C_4$–$C_{12}$-alkenylene subject to the proviso that the carbon atom attached to the nitrogen atom is a primary carbon atom, or is $C_8$–$C_{12}$-aralkylene.

2. A compound according to claim 1, in which $R_1$ is hydrogen, methyl, allyl, benzyl or acetyl, $R_2$ is $C_2$–$C_{12}$-alkylene or $C_4$–$C_{12}$-alkylene containing 1 or 2 oxygen atoms in the chain, $R_3$ is $C_2$–$C_{12}$-alkylene, $C_4$–$C_{12}$-alkylene containing 1 or 2 oxygen atoms in the chain, $C_6$–$C_{14}$-cycloalkylene, a group of the formula (II) in which $R_4$ is hydrogen or methyl or a group of the formula (III) in which $R_5$ is $C_2$–$C_6$-alkylene, 2-butene-1,4-diyl or xylylene.

3. A compound according to claim 1, in which $R_1$ is hydrogen or methyl, $R_2$ is $C_2$–$C_6$-alkylene, $R_3$ is $C_2$–$C_6$-alkylene or a group of the formula (II) in which $R_4$ is hydrogen or methyl.

4. A compound according to claim 1, in which $R_1$ is hydrogen, methyl, allyl, benzyl or acetyl.

5. A compound according to claim 1, in which $R_1$ is hydrogen or methyl.

6. A compound according to claim 1, in which $R_3$ is a group of the formula (II) with $R_4$ being hydrogen.

7. A compound according to claim 1, of the repeating structural unit

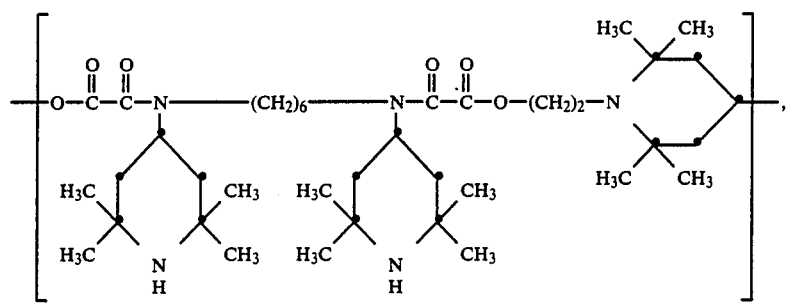
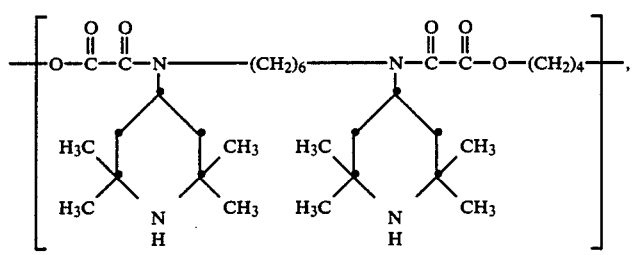
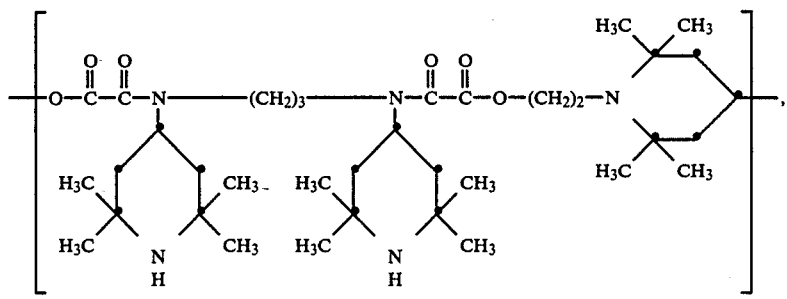
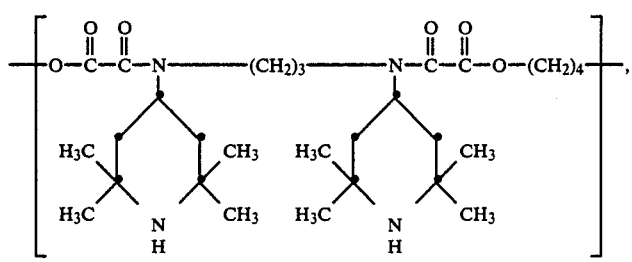
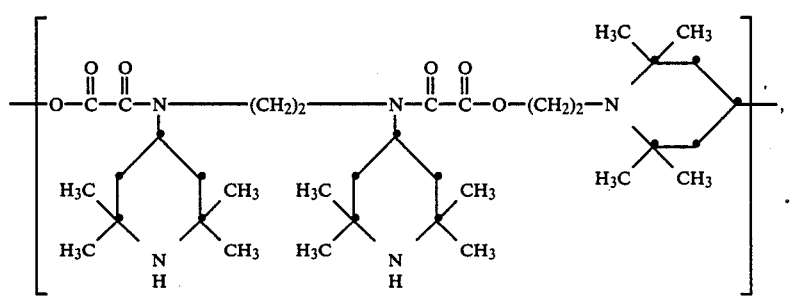

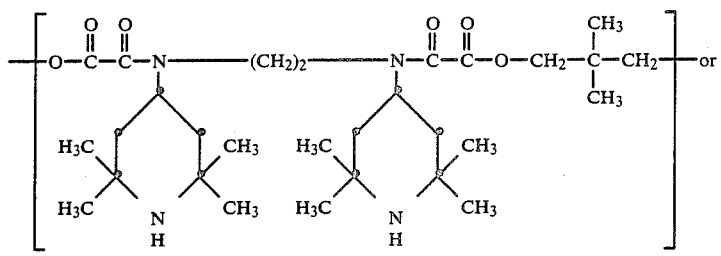

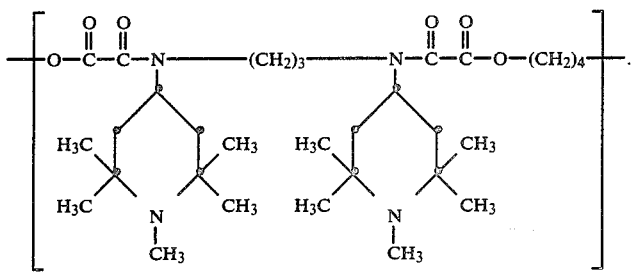

8. A compound according to claim 1, of the repeating structural unit

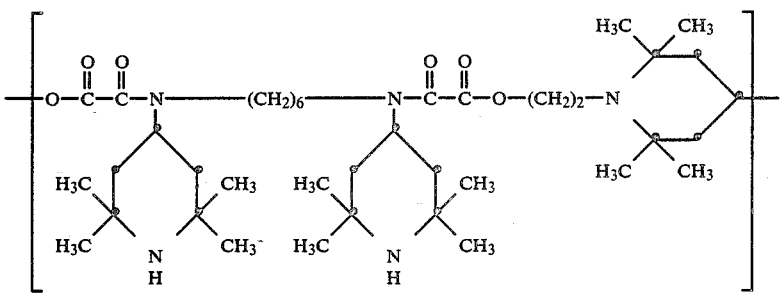

or

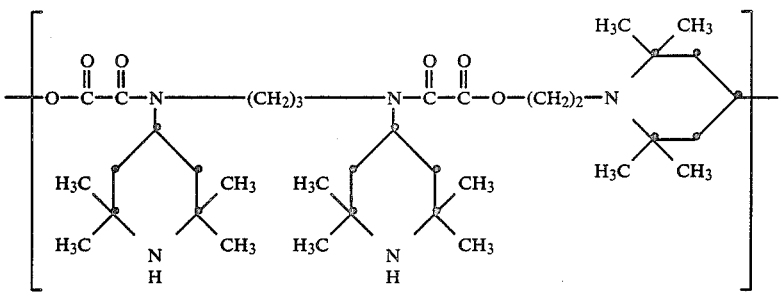

9. A composition of matter comprising an organic material subject to oxidative, thermal and/or light induced degradation stabilized with an effective stabilizing amount of a compound of claim 1.

10. A composition according to claim 9, wherein the organic material is a synthetic polymer.

11. A composition according to claim 9, wherein the organic material is a polyolefin.

12. A composition according to claim 11, wherein the polyolefin is polyethylene or polypropylene.

13. A composition according to claim 9, which, in addition to the compound of formula (I), also comprises other conventional additives for synthetic polymers.

14. A method for stabilizing an organic material against oxidative, thermal and/or light induced degradation which comprises incorporating into said organic material an effective stabilizing amount of a compound of claim 1.

* * * * *